United States Patent [19]

Collins

[11] Patent Number: 4,495,323
[45] Date of Patent: Jan. 22, 1985

[54] SOLVENT RESISTANT POLYMERIC COMPOSITION

[75] Inventor: James H. Collins, Houston, Tex.

[73] Assignee: Shell Oil Company, Houston, Tex.

[21] Appl. No.: 577,452

[22] Filed: Feb. 6, 1984

Related U.S. Application Data

[63] Continuation-in-part of Ser. No. 542,866, Oct. 17, 1983, abandoned.

[51] Int. Cl.³ .................. C08L 23/08; C08L 53/02; C08K 3/26; C08K 5/01
[52] U.S. Cl. .................................. 524/426; 524/427; 524/505; 525/89; 525/95; 525/98; 36/25 R
[58] Field of Search ................. 525/89, 95, 98; 523/167; 36/25 R; 524/426, 427, 505

[56] References Cited

U.S. PATENT DOCUMENTS

| | | | |
|---|---|---|---|
| Re. 28,236 | 11/1974 | Hendricks et al. | 36/87 |
| 3,614,836 | 10/1971 | Snyder et al. | 523/167 |
| 4,039,629 | 8/1977 | Himes et al. | 525/89 |
| 4,216,131 | 8/1980 | Himes et al. | 523/167 |
| 4,216,132 | 8/1980 | Zweig et al. | 525/89 |
| 4,377,658 | 3/1983 | Collins | 525/98 |
| 4,386,125 | 5/1983 | Shiraki et al. | 525/89 |
| 4,386,188 | 5/1983 | Grancio et al. | 525/98 |
| 4,409,357 | 10/1983 | Milkovich | 525/98 |

*Primary Examiner*—Allan M. Lieberman
*Attorney, Agent, or Firm*—Peter A. Bielinski

[57] ABSTRACT

A polymeric composition having good hardness, stiffness and tear strength and good resistance to flex cracking, solvent attack and abrasion comprises a radial monoalkenyl arene-conjugated diene block copolymers, a linear low density polyethylene, hydrocarbon extending oil, polystyrene resin and a filler.

7 Claims, No Drawings

SOLVENT RESISTANT POLYMERIC COMPOSITION

This application is a continuation-in-part of U.S. Ser. No. 542,866, filed Oct. 17, 1983, now abandoned.

BACKGROUND OF THE INVENTION

1. Field of the Invention

The invention relates to a polymeric composition having good hardness, stiffness and tear strength and good resistance to flex cracking, solvent attack and abrasion. More particularly, the invention relates to a polymeric composition containing a mixture of two radial monoalkenyl arene conjugated diene block copolymers and a linear low density polyethylene along with various other components.

2. Description of the Prior Art

The use of certain block copolymers and their compounds in a number of end-uses and especially footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. Re. No. 28,236. In general, these shoe component compositions usually comprise a mixture of block copolymer, extending oil, polystyrene and possibly a filler.

For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination and free from elephant hide. For some important commercial applications, it is also important that the shoe soles also possess solvent resistance and oil resistance. Improved footwear compositions have been made, such as those compositions disclosed in U.S. Pat. Nos. 4,216,131 and 4,216,132. However, the prior art compositions still did not possess sufficient solvent resistance. U.S. Pat. No. 4,216,131 disclosed a composition containing ethylene-vinyl acetate (EVA) and low density polyethylene. U.S. Pat. No. 4,216,132 disclosed a composition containing high density polyethylene and U.S. Pat. No. 4,377,658 disclosed a composition containing ethylene vinyl acetate copolymer and high density polyethylene. All of these showed improved properties. U.S. application Ser. No. 524,835 disclosed a composition containing a combination of EVA and linear low density polyethylene (LLDPE). It has now been found that a composition containing a mixture of radial block copolymers and linear low density polyethylene (LLDPE) alone exhibits comparable properties at some cost saving since LLDPE is less expensive than analogs used previously.

SUMMARY OF THE INVENTION

The present invention deals with novel footwear compositions having a superior balance of properties. Specifically, the present invention is a polymeric composition having superior resistance to environmental flex cracking, solvent attack and abrasion comprising:

(a) about 5 to about 90 parts by weight of a radial $(AB)_xBA$ block copolymer where x is greater than 1, each block A being a monoalkenyl arene polymer block having an average molecular weight between about 5,000 and about 30,000, each block B being an elastomeric conjugated diene polymer block having an average molecular weight between about 15,000 and about 300,000, the blocks A comprising between about 20 and about 40 percent by weight of said block copolymer having a melt index between about 0.1 and about 30.0;

(b) 0–100 parts of a radial $(CD)_xDC$ block copolymer where x is greater than 1, each block C being a monoalkenyl arene polymer block having an average molecular weight between about 20,000 and about 40,000, each block D being an elastomeric conjugated diene polymer block having an average molecular weight between about 15,000 and about 300,000, the blocks C comprising about 40 to about 55 percent by weight of said block copolymer;

(c) about 10 to about 95 parts by weight of a linear low density polyethylene;

(d) about 0 to about 200 parts by weight of a hydrocarbon rubber extending oil;

(e) about 0 to about 150 parts by weight of a polystyrene resin; and (f) about 0 to about 200 parts by weight of a finely divided filler.

As shown in the illustrative embodiments which follow, the novel compositions according to the present invention have attractive physical properties and are useful, for example, in footwear.

DETAILED DESCRIPTION OF THE INVENTION

The block copolymer component of the present invention is one or optionally two radial block copolymers. The first block copolymer is a radial $(AB)_xBA$ block copolymer, where x is greater than 1. The second block copolymer is a radial $(CD)_zDC$ block copolymer where z is greater than 1. Preferably, x and z vary from over 1 to 15, more preferably from about 2 to about 6.

The A and C blocks are monoalkenyl arene polymer blocks and the B and D blocks are elastomeric conjugated diene polymer blocks. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrenes as well as mixtures of the same. The conjugated diene monomer preferably has 4 to 5 carbon atoms, such as butadiene and isoprene with butadiene being most preferred.

The average molecular weight of each of the blocks in the block copolymer may be varied within the ranges specified below.

Regarding the $(AB)_xBA$ block copolymer, the monoalkenyl arene polymer A blocks preferably have number average molecular weights between bout 5,000 and about 30,000, more preferably between about 15,000 and about 25,000. The elastomeric conjugated diene polymer B blocks preferably have number average molecular weights between about 15,000 and about 300,000, more preferably between about 25,000 and about 70,000. The weight percentage of the thermoplastic monoalkenyl arene A blocks in the finished second block polymer should be between about 20% and 40%, preferably between about 25 and about 35% by weight.

The $(AB)_xBA$ block copolymer component as claimed has viscosity characteristics similar to those of the polyethylene component at the temperatures present during extrusion. The similar viscosity characteristics of these two components allows for domain formation in the extruded material which results in what is known in the art as "interpenetrating networks" (IPN) or two continuous phases. These continuous phases give rise to the superior properties which are found in the resulting material. The parameter which is used to obtain similar viscosities for the purpose of the invention is melt index. The melt index for the block copolymer should be in the range from about 0.1 to about 30.

As known from the prior art the amount of block copolymer necessary for the formation of an IPN ranges from about 5% by weight to about 90% by weight of the two components.

Regarding the $(CD)_xDC$ block copolymer, the monoalkenyl arene polymer C blocks preferably have number average molecular weights between about 20,000 and about 40,000, more preferably between about 22,000 and about 30,000. The elastomeric conjugated diene polymer D blocks preferably have number average molecular weights between about 15,000 and about 300,000, more preferably between about 25,000 and about 50,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished first block polymer should be between about 40 and 55%, preferably between about 40% and about 50% by weight. The general type and preparation of these block copolymers are described in U.S. Pat. Re. No. 28,246 and in many other U.S. and foreign patents.

The $(CD)_xDC$ block copolymer is used in the process of the present invention as a flow modifier as an aid to extrusion. This copolymer has a higher percent by weight of monoalkenyl arene polymer which gives the copolymer a lower viscosity or higher melt flow and therefore can be extruded more easily. With this copolymer present in the blend the blend can be used with conventional low pressure injection molding equipment while without it the blend can only be used with high pressure injection molding machines.

The amount of the $(CD)_xDC$ copolymer employed will vary with the application and the type of machinery and should be used in amounts sufficient to provide the desired flow rates.

The linear low density polyethylenes useful herein should have melt indices between about 0.1 and 30 and a density greater than about 0.90 grams per cubic centimeter (g/cm$^3$). Typical linear low density polyethylenes (LLDPE) have densities of around 0.90 to 0.94, a crystalline melting point of over about 100° C., and a molecular weight of between about 40,000 and 1,000,000. Melt index is important in that it relates to the viscosity characteristics of the polyethylene.

The process by which these polyethylenes are prepared does not form a part of the present invention. They may, in fact, be prepared by any of the well-known methods such as those described in the book "Polyethylene" by Raff and Allison, Interscience Publishers (1956). See also the Kirk-Othmer Encyclopedia of Science and Technology, Volume 14, pages 242-282 (2nd ed. 1967).

The amount of polyethylene employed varies from about 5 phr (parts by weight per hundred parts by weight rubber, or block copolymer component as in this case) to about 100 phr, preferably between about 10 and about 30 phr.

Another component of the present invention is a polystyrene resin. As used in the specification and claims, the term "polystyrene resin" includes crystal polystyrene, high impact polystyrene, medium impact polystyrene and poly (alpha-methylstyrene). The amount of polystyrene resin employed varies from about 0 phr to about 50 phr, preferably between about 5 phr and about 30 phr.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX® oils, Nos. 310, 371 and 311 (which is a blend of 310 and 371). The amount of extending oil employed varies from about 0 to about 200 phr, preferably from about 25 to about 160 phr.

The fillers which may be used in the present compositions are well known in the art and include clay, talc, silica, titanium dioxide, carbon blacks, calcium carbonate, and other pigments as well as fibrous fillers such as cellulosic, polyester or acrylic fibers, sawdust, ground cork, etc. Preferred fillers include silica and calcium carbonate. The amount of filler employed varies from 0 to about 200 phr, preferably 10 to about 60 phr. Additional minor amounts of antioxidants, ultraviolet stabilizers and the like may also be added.

The components of this invention may be combined by processes known in the art including blending such as by extrusion, Banbury mixing or by dry-blending procedures. In the latter case, it is preferred that the block copolyer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end-uses also are contemplated. These include, for example, automotive parts and wire and cable coatings. Tubular products such as hoses and the like also are contemplated.

The use of the present composition in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper which may be canvas or various natural and synthetic fibers, including leather, vinyl and polymeric materials. In some cases precoating of the upper with a primer is required to effect adhesion.

The invention is further illustrated by means of the following illustrative embodiment, which is given for the purpose of illustration alone and is not meant to limit the invention to the particular reactants and amounts disclosed.

ILLUSTRATIVE EMBODIMENT I

In illustrative Embodiment I, six different compositions were prepared—four outside the scope of the invention and two within the scope of the invention. The various components are described below:

| Component | Description |
|---|---|
| Block Copolymer #1 | A radial styrene-butadiene-block copolymer having a structure (S B)$_{\overline{x}}$B-S where x averages about 2.5 and which has a molecular weight distribution according to the invention and referred to as (AB)$_{\overline{x}}$BA. |
| Block Copolymer #2 | A radial styrene-butadiene block copolymer having a structure (S B)$_{\overline{z}}$B-S where z averages about 2.5 and has a molecular weight distribution according to the invention and referred to as (CD)$_{\overline{z}}$DC. |
| Oil | A hydrocarbon rubber extending oil. |
| LLDPE | A linear low density polyethylene having a melt flow index of 1.0 and a density of 0.93 g/cm$^3$. |
| Poly (AMS) | A poly (alpha-methylstyrene) resin. |

All components contained the same standard antioxidant-inhibitor package. Samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |

The various formulations and test results are presented below in Table I.

TABLE I

| A. COMPOSITION (Parts by Weight) | | | | | | |
|---|---|---|---|---|---|---|
| Composition Number | 1 | 2 | 3 | 4 | 5 | 6 |
| According to the Invention? | No | No | No | No | Yes | Yes |
| Block Copolymer #1 | 50 | 50 | 50 | 50 | 50 | 50 |
| Block Copolymer #2 | 50 | 50 | 50 | 50 | 50 | 50 |
| Oil | 120 | 97 | 97 | 97 | 97 | 97 |
| Silica Filler | 25 | 20 | 25 | 25 | 25 | 25 |
| EVA | 43 | 40 | 22 | 22 | — | — |
| HDPE | | | 22 | 22 | | |
| Poly (AMS) | 17 | 17 | 17 | 17 | 17 | 17 |
| Additive Package | 1.45 | 1.45 | 1.45 | 1.45 | 1.45 | 1.45 |
| LLDPE | | | | | 40[1] | 40[2] |
| B. PROPERTIES | | | | | | |
| Hardness (Rex, flex bar) | 56 | 60 | 70 | 65 | 66 | 70 |
| Hardness, Shore A CM, 120° C. (Inst/10 sec) | 57/53 | 62/56 | 70/65 | 68/64 | 69/63 | 74/68 |
| Melt Index (Cond. E) (g/10 min) | 6.8 | 2.87 | 0.61 | 1.63 | 1.65 | 1.96 |
| Taber Abrasion Resistance (cc/kc) | 0.72 | 0.63 | 0.59 | 0.55 | 0.71 | 0.53 |
| Tinius Olsen Stiffness, (psi) | 1229 | 1229 | 1781 | 1815 | 1750 | 2057 |
| Adhesion, (pli) | 34 | 59 | 48 | 50 | 47 | 60 |
| Type tear | Cohesive | Cohesive | Cohesive | Cohesive | Rubber Tear | Cohesive |
| Trouser Tear, pli | — | 113/121 | 150/143 | 150/145 | 130/118 | 154/153 |

[1]Dowlex 2045 (Dow Chemical Co.)
[2]LPX 12 (Union Carbide Inc.)

What is claimed is:

1. A polymeric composition comprising:
   (a) about 5 to about 90 parts by weight of a radial (AB)$_x$BA block copolymer where x is greater than 1, each block A being a monoalkenyl arene polymer block having an average molecular weight between about 5,000 and about 30,000, each block B being an elastomeric conjugated diene polymer block having an average molecular weight between about 15,000 and about 300,000, the blocks A comprising between about 20 and about 40 percent by weight of said block copolymer having a melt index between about 0.1 and about 30.0;
   (b) 0–100 parts of a radial (C D)$_x$DC block copolymer where x is greater than 1, each block C being a monoalkenyl arene polymer block having an average molecular weight between about 20,000 and about 40,000, each block D being an elastomeric conjugated diene polymer block having an average molecular weight between about 15,000 and about 300,000, the blocks C comprising about 40 to about 55 percent by weight of said block copolymer;
   (c) about 10 to about 95 parts by weight of a linear low density polyethylene having a melt index between about 0.1 and 30, and a density greater than about 0.90 grams per cubic centimeter;
   (d) about 0 to about 200 parts by weight of a hydrocarbon rubber extending oil;
   (e) about 0 to about 150 parts by weight of a polystyrene resin; and
   (f) about 0 to about 200 parts by weight of a finely divided filler.

2. The composition according to claim 1 wherein said A blocks, and said C blocks are polystyrene blocks while said B blocks, and said D blocks are polybutadiene blocks.

3. The composition according to claim 1 wherein said copolymers and said polyethylene have melt flow indices of between about 0.1 and about 30.0.

4. The composition according to claim 1 wherein said polystyrene resin is a poly (alpha-methylstyrene) resin and the amount of said polystyrene is between about 5 and about 30 parts by weight.

5. The composition according to claim 1 wherein said filler is selected from the groups consists of calcium carbonate and silica and the amount of said filler is between about 10 and about 60 parts by weight.

6. The composition of claim 1 wherein said (a) component is present at between about 30 and about 70 parts by weight and said (c) component is present at between about 30 and about 70 parts by weight.

7. A shoe sole having the composition of claim 1.

* * * * *